Aug. 24, 1926.

Re. 16,408

J. H. VINTON

HEEL TURNING MACHINE

Original Filed May 20, 1920 3 Sheets-Sheet 1

INVENTOR

John H. Vinton,
Deceased
United Shoe Machinery Corporation,
Assignee,
By its Attorney
Nelson W. Howard Aug. 24, 1926.
Re. 16,408
J. H. VINTON
HEEL TURNING MACHINE
Original Filed May 20, 1920 3 Sheets-Sheet 2
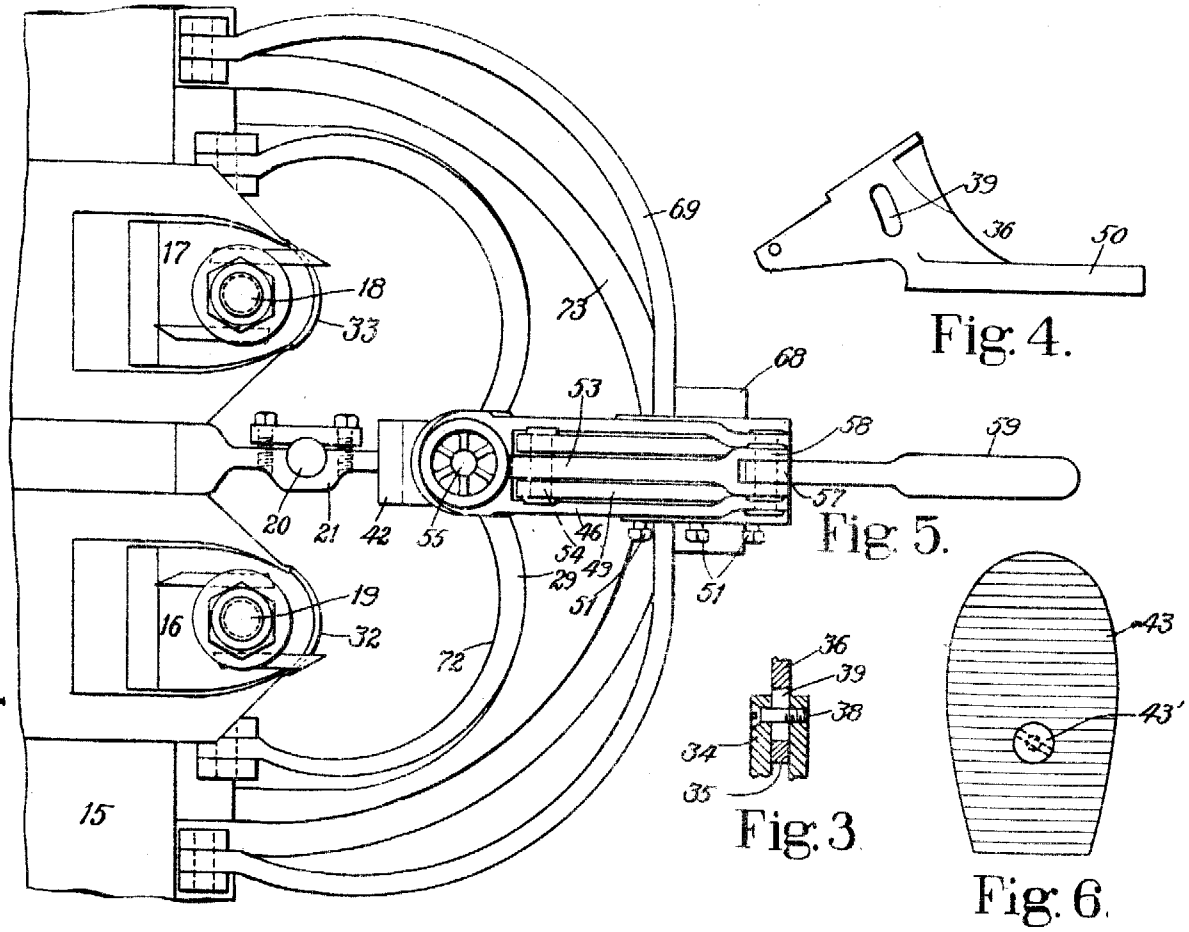
INVENTOR
John H. Vinton,
Deceased
United Shoe Machinery Corporation
Assignee,
By its Attorney,
William W. Howard Aug. 24, 1926.

Re. 16,408

J. H. VINTON

HEEL TURNING MACHINE

Original Filed May 20, 1920 3 Sheets-Sheet 3

INVENTOR

John H. Vinton,
Deceased
United Shoe Machinery Corporation,
Assignee,
By its Attorneys
Albert H. Howard Issued Aug. 24, 1926. Re. 16,408

UNITED STATES PATENT OFFICE.

JOHN H. VINTON, DECEASED, LATE OF KEENE, NEW HAMPSHIRE; BY UNITED SHOE MACHINERY CORPORATION, OF PATERSON, NEW JERSEY, ASSIGNEE BY MESNE ASSIGNMENTS.

HEEL-TURNING MACHINE.

Original No. 1,397,844, dated November 22, 1921, Serial No. 382,848, filed May 20, 1920. Application for reissue filed October 25, 1923. Serial No. 670,799.

This invention relates to heel shaping machines and is disclosed in connection with a machine for turning wood heels.

In wood heel turning machinery as ordinarily constructed, the work holder or jack is rotated before the cutter by a handle grasped by the operator. The work is clamped in the jack by a clamping mechanism which is tightened and loosened by the operator as he inserts or removes a heel blank, by means of a manually operated member. The operation of this member in handling a blank requires several movements of the hand which then has to be moved to the jack operating handle (or this order of movements may be reversed). In any event, the numerous movements required consume much time.

It is an object of the present invention to avoid the necessity of so many movements on the part of the operator, with the accompanying loss of time. To this end in accordance with a principal feature of the invention, as herein illustrated, the clamping handle of the jack is arranged to be used as the main operating handle by which the jack is swung to cut a heel. Thus the operator does not have to shift his hand from the operating handle to the clamping mechanism, or vice versa, and is enabled to save much time as compared with heretofore known machines.

It has been found in machines of this character that there is a tendency to lift the block holder during the cutting operation and thus make defective heels and it is one of the objects of this invention to overcome that difficulty. Accordingly, a spring is provided to hold the block holder down in proper position.

These and other features of the invention will be apparent from the following description of an illustrative embodiment of the invention read in connection with the appended drawings.

Referring to the drawings:

Fig. 3 is a detail sectional elevation taken on the line 3—3, Fig. 1.

Fig. 4 is a detail side elevation of the primary frame.

Fig. 5 is a plan view of my improved block holder showing the same in connection with a portion of a heel turning machine.

Fig. 6 is a plan view of the block holder plate.

Figures 1, 2:
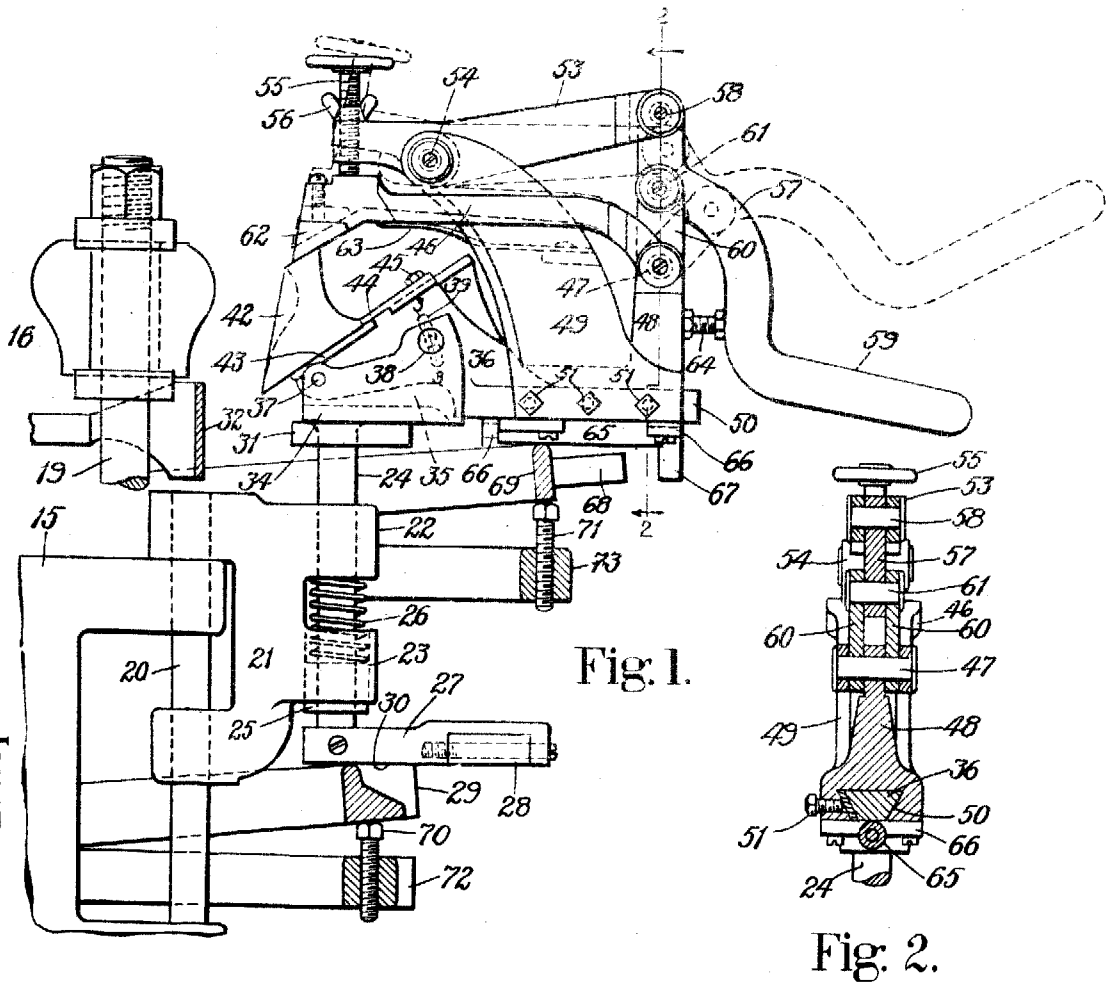
Figure 1 is a side elevation partly in section of the improved block holder showing the same positioned upon a portion of a heel turning machine.
Fig. 2 is a detail sectional elevation taken on the line 2—2, Fig. 1.

Figs. 7 to 12 inclusive are diagrammatic plan views illustrating the different positions which are assumed by the block holder and its former relatively to the cutter.

Like numerals refer to like parts throughout the several view of the drawings.

In the drawings, 15 is the frame of the heel turning machine, 16 and 17 are the cutters which are fast to vertical rotary shafts 18 and 19 respectively, said shafts being rotatably mounted in bearings on the frame of the machine. 20 is a vertical shaft upon which is rotatably mounted an arm 21. The arm 21 is provided with bearings 22 and 23 in which is slidably and rotatably mounted a shaft 24. The shaft 24 has a collar 25 fastened thereto and between this collar and the lower end of the bearing 22 said shaft 24 is encircled by a spring 26, the tendency of said spring being to hold the shaft 24 downwardly. To the lower end of the shaft 24 is fastened an arm 27 and journaled to said arm is a long roll 28 which is adapted, when the blank holding mechanism or jack is being swung to cut a heel, as will be described, to engage a cam track 29, which is pivotally mounted at its ends on the frame of the machine. When the machine is not actually cutting a heel, the arm 21 is pulled out to its central position as shown in Fig. 5, when the said cam track will engage a flat surface 30 upon the under side of said arm 27.

The upper end of the shaft 24 has a former 31 fastened thereto which in the operation of the machine is adapted to engage guides 32 and 33, as hereinafter described. A frame-holder 34 is also fastened to the upper end of the shaft 24 and is slotted at 35 to receive a portion of a primary frame 36 which projects into said slot and is pivoted to the frame-holder 34 at 37. A screw 38 projects through the frame-holder 34 and through the slot 35 and also projects through a slot 39 provided in the frame 36 and has screw-threaded engagement with the frame-holder 34 on one side of said slot 35 so that by tightening up the screw 38 any wear which may take place between the frame 36 and the opposite sides of the slot 35 in the holder 34 will be taken up so that the frame 36 may always have a suitably snug fit in the slot 35. A wood heel blank 42 rests upon a support 43 which is fastened to and forms in effect a portion of the primary frame 36. A gage 44 is adjustably fastened by means of a screw 45 to the primary frame 36.

The wood heel blank 42 is clamped against the support 43 by a primary clamping member 46, said primary clamping member being pivotally mounted upon a pin 47 which is supported in a standard 48 forming a portion of an auxiliary frame 49. The auxiliary frame 49 is slidably mounted transversely of the shaft 24 upon ways 50 provided upon the primary frame 36 and is held in adjusted position by set screws 51. The primary clamping member 46 is bifurcated to allow the auxiliary frame 49 to project upwardly therethrough, and upon the upper end of said auxiliary frame a secondary clamping member 53 is pivoted at 54. An adjusting screw 55 has screw-threaded engagement with the front end of said secondary clamping member and the lower end thereof rests against the upper edge of the primary clamping member 46 at its forward end. The screw 55 is locked in adjusted position by a set nut 56. A toggle lever 57 is pivoted at 58 to the rear end of the secondary clamping member 53. Said toggle lever is provided with a handle 59. A pair of links 60 are mounted upon the pin 47 at their lower ends and at their upper ends are connected to the toggle lever 57 by a pin 61. When the toggle lever 57 and the links 60 are in the position illustrated in full lines, Fig. 1, then the secondary clamping member is in position to force the primary clamping member downwardly at its forward end, and by so doing to force a jaw 62 which is attached to said primary clamping member against the blank 42 and thus to clamp said blank between the jaw 62 and the support 43. When the toggle lever 57 is moved to the position illustrated in dotted lines, Fig. 1, the links 60 and the secondary clamping member assume the positions illustrated in dotted lines in said figure, and the primary clamping member 46 is raised to the position illustrated in dotted lines by a flat spring 63 which, at its rear end, is fastened to the auxiliary frame 49, and at its front end bears against the under side of the primary clamping member 46. When the toggle lever is moved to its lowered position indicated in full lines Fig. 1, it is stopped from further movement in the same direction by a stop screw 64 which is fastened to the arm 48 of the auxiliary frame 49, and when in this position the pivots of the links and of the toggle lever are in alinement so that the greatest power of the toggle consisting of the toggle lever and the toggle links is then in effect and the blank is clamped in position between the jaw 62 and the support 43 and the parts are then locked in clamping position. The frame 36 is provided with a roll 65 which is journaled upon bracket 66 fast to the underside of the auxiliary frame 49 and said bracket is extended downwardly at 67 to form an arm which is adapted to engage a stop or projection 68 and thus prevent the jack from accidentally falling on to one of the cutters when the machine is idle. The projection 68 is fastened to a cam track 69 which in turn is pivotally mounted at its ends upon the frame 15 of the machine and is engaged by the roll 65, when the machine is cutting a heel. Both the track 29 and the track 69 may be pivotally adjusted upwardly and downwardly about the pivotal bearings (Fig. 5) at their ends by means of adjusting screws 70 and 71 respectively, which adjusting screws have screw-threaded engagement with brackets 72 and 73 fast to the frame 15 of the machine.

It is also very essential that different heights of heels may be clamped in the same holder and to do this different jaws 62 may be provided, also. The tipping of the jaw 62 upon its pivot 74 facilitates its fitting the upper surface of the heel blank.

It is also desirable that in a device of this character the primary clamping member, the secondary clamping member and the toggle device should be adjustable simultaneously in order that the forward end of the primary clamping member and its jaw 62 may be positioned to suit varying shapes and sizes of heels, and this is accomplished in this embodiment of my invention by adjusting the auxiliary frame 49 together with its arm 48 forwardly or backwardly upon the ways 50 and then clamping the auxiliary frame to the ways 50 by means of the set screws 51.

It will be seen that the support 43 being fastened to the frame 36 by a screw 43′, different supports may be attached to said frame, of different contours, lengths and widths and also of different thicknesses as may be desired to accommodate different shapes, sizes or heights of blocks and heels which are formed from said blocks.

It will be understood that the primary frame 36 and the auxiliary frame 49 form together in effect a single frame and in some of the claims the word "frame" is used with this meaning.

The heel blank holding and clamping mechanism comprising the elements 36, 49, 43, 46 is herein collectively designated by the term "jack".

The general operation of the mechanism hereinbefore specifically described is as follows:—A wood heel blank 42 is placed upon the support 43 with the front edge of the blank corresponding to the breast of the finished heel abutting against the gage 44. At this time the handle 59 of the toggle lever 57 will be in its raised or dotted position, Fig. 1. The clamping member 53 and the links will also be in the dotted positions shown in Fig. 1 and the primary clamping member will be raised to the dotted position illustrated in Fig. 1 by the spring 63. The blank having been placed in position, the handle 59 is now pushed downwardly from the dotted position to the full position illustrated in Fig. 1, thus causing the toggle links and their pivots and the pivot of the toggle lever to be brought into alinement with each other and causing the secondary clamping member 53 through the screw 55 to force the primary clamping member and its jaw 62 downwardly, thus firmly clamping the blank 42 in position against its support 43. At this time the longitudinal median plane B—B, Fig. 7, of the support 43 coincides with the longitudinal median plane A—A of the arm 21.

Figure 8:
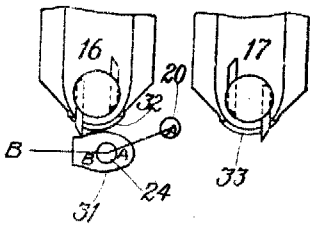
Figure 9:
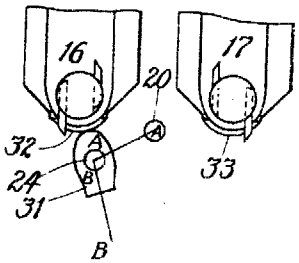

The operator then, by means of the handle 59, moves the support 43 and the parts supported thereon until the center lines A—A and B—B of the arm 21 and support 43 respectively assume the relative positions illustrated in Fig. 8 with the former 31 in engagement with the guide 32 and with one side of the blank in engagement with the cutter 16, the operator then turns the support counter-clockwise, the blank being held in engagement with the cutter 16 until the parts arrive in the position illustrated in Fig. 9. During these motions the former 31 is held against the guide 32 and the frame 36 is raised and lowered by means of the shaft 24, arm 27 and track 29 and is tipped upon its pivot 37 by means of the roll 65 and cam-shaped track 69 in order to produce the proper shaped contour for the heel of the shoe on one side of the heel from the breast to the middle of the back of said heel, all in a manner well known to those skilled in this art.

Figure 7:
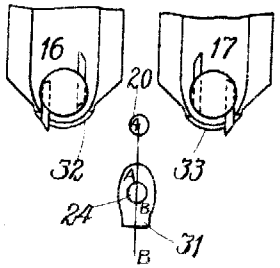
Figure 10:
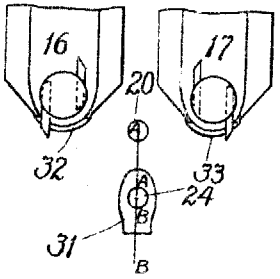
Figure 11:
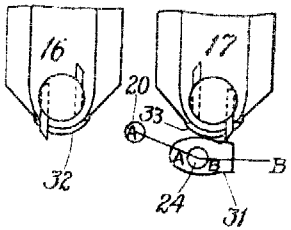
Figure 12:
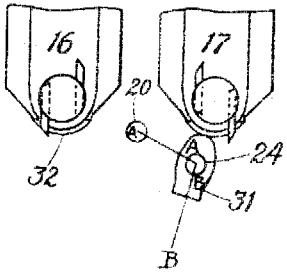

The operator having finished one side of the heel now moves the parts to the position illustrated in Fig. 10 which is the same as the position illustrated in Fig. 7 and then moves the parts until their center lines A—A and B—B assume the positions illustrated in Fig. 11 and finally to the positions illustrated in Fig. 12, thus completing the forming of the heel of the shoe.

The parts are then moved back to the position illustrated in Fig. 7 and the toggle lever 57 is thrown into the position illustrated in dotted lines, Fig. 1, thus releasing the heel and allowing it to be removed by the operator or to drop from the holder.

The combination of the operating and clamping functions in the lever 59 constitutes a very important feature of the present invention. The operator is thus enabled to turn one side of the heel, unjack it, and jack the new blank with successive movements of the same hand, without removal from the lever. The saving of time resulting from this construction is very important. It has been found that a very slow operator, with the machine of the present invention, can equal the production of a very fast operator who is using one of the old forms of jacks.

Having described the invention, what we claim as new and desire to secure by Letters Patent of the United States is:—

1. A heel turning machine block holder having, in combination, a support for a block, a primary clamping member adapted to engage said block, a pivot for said primary clamping member, and a lever constituting a secondary clamping member and adapted to engage said primary clamping member and cause the same to engage said block and force it against said support, and a toggle device connected to said secondary clamping member and adapted to cause the same to engage said primary clamping member and lock said primary and said secondary clamping members in position with said block clamped against said support.

2. A heel turning machine block holder having, in combination, a support for a block, a frame constituting a portion thereof, a frame-holder upon which said frame is pivoted, a primary clamping member pivoted to said frame, a lever constituting a secondary clamping member pivoted to said frame, a toggle lever pivoted to said secondary clamping member and a toggle link connecting said toggle lever to said frame whereby said secondary clamping member may be caused to engage said primary clamping member and cooperate with the same to force said block against said support.

3. A heel turning machine block holder having, in combination, a support for a block, a frame constituting a portion thereof, a frame-holder upon which said frame is pivoted, a primary clamping member pivoted to said frame, a lever constituting a secondary clamping member pivoted to said frame, and a toggle lever and link pivoted to each other, one of said toggle members being pivotally connected to said secondary clamping member and the other to said frame whereby said secondary clamping member may be caused to cooperate with said primary clamping member to force said block against said support.

4. A heel turning machine block holder having, in combination, a support for a block, a frame constituting a portion thereof, a frame-holder upon which said frame is pivoted, a primary clamping member pivoted to said frame, a lever constituting a secondary clamping member pivoted to said frame, a toggle lever and link pivoted to each other, one of said toggle members being pivotally connected to said secondary clamping member and the other to said frame whereby said secondary clamping member may be caused to cooperate with said primary clamping member to force said block against said support, and means to limit the distance to which said toggle lever can be rocked in one direction.

5. A heel turning machine block holder having, in combination, a support for a block, a primary frame constituting a portion thereof, a frame holder upon which said primary frame is pivoted, a vertical shaft constituting a pivot for said frame holder, an auxiliary frame slidable upon said primary frame transversely of said vertical shaft, a primary clamping member pivoted on said auxiliary frame, a secondary clamping member pivoted on said auxiliary frame and adapted to cooperate with said primary clamping member to cause it to engage said block and clamp said block to said support, and a toggle device adapted to lock said secondary clamping member in position with said primary clamping member, forcing said block against said support.

6. A heel turning machine block holder having, in combination, a support for a block, a primary frame constituting a portion thereof, a frame holder upon which said primary frame is pivoted, a vertical shaft constituting a pivot for said frame holder, an auxiliary frame slidable upon said frame transversely of said vertical shaft, a primary clamping member pivoted on said auxiliary frame, a secondary clamping member pivoted on said auxiliary frame and adapted to cooperate with said primary clamping member to cause it to engage said block and clamp said block to said support, a toggle lever pivoted to said secondary clamping member, and a toggle link pivoted to said auxiliary frame and pivotally connected to said toggle lever whereby said secondary clamping member may be caused to engage said primary clamping member to force said block against said support and lock said clamping members in position.

7. A heel turning machine having, in combination, a support for a block, a frame constituting a portion of said support, a primary clamping member pivoted to said frame and adapted to engage said block, a lever constituting a secondary clamping member pivoted to said frame and adapted to engage said primary clamping member, a toggle device adapted to lock said primary and secondary clamping members in position with said block clamped against said support, a roll journaled upon said frame and extending transversely of said shaft and a cam-shaped track upon which said roll is adapted to travel whereby a rocking motion may be imparted to said frame.

8. A heel turning machine having, in combination, a support for a block, a frame constituting a portion thereof, a frame holder upon which said frame is pivoted, a vertical rock-shaft to which said frame holder is fastened, a primary clamping member pivoted to said frame and adapted to engage said block, a lever constituting a secondary clamping member pivoted to said frame and adapted to engage said primary clamping member, a toggle device adapted to lock said primary and secondary clamping members in position with said block clamped against said support, a roll journaled upon said frame and extending transversely of said rock-shaft, a cam-shaped track upon which said roll is adapted to travel whereby a rocking motion may be imparted to said frame, an arm fastened to said rock-shaft, a roll journaled upon said arm and extending transversely of said rock-shaft and a second cam-shaped track adapted to be engaged by said last mentioned roll whereby a vertical movement may be imparted to said block holder.

9. A heel turning machine having, in combination, a support for a block, a frame constituting a portion thereof, a frame holder upon which said frame is pivoted, a vertical rock-shaft to which said frame holder is fastened, means mounted upon said frame adapted to clamp a block against said holder, a roll journaled upon said frame and extending transversely of said rock-shaft, a cam-shaped track upon which said roll is adapted to travel, an arm fastened to said rock-shaft, a roll journaled upon said arm and extending transversely of said rock-shaft, a second cam-shaped track adapted to be engaged by said last-mentioned roll, and a spring acting to move said rock-shaft downwardly, whereby said rolls may be held in engagement with their respective tracks and a combined vertical and rocking motion imparted to said frame.

10. In a machine of the class described, a cutter, a pivoted jack arranged to carry a heel blank into different positions relatively to the cutter, a clamping mechanism on the jack to hold the heel blank, and a manually operable member for operating the clamping mechanism arranged also to move the jack relatively to the cutter.

11. In a machine of the class described, a heel shaping cutter, a jack pivotally mounted on the machine arranged to be swung past the cutter by the operator, a clamping mechanism for the heel blank on the jack, a manually operable member arranged to move generally perpendicularly to the direction of the said swinging movement to clamp the heel blank, and arranged also to effect the said swinging movement.

12. In a machine of the class described, a rotating heel shaping cutter, a swinging arm, a jack pivoted on the arm and arranged to be swung by the operator about an axis parallel to that of the cutter, a lever projecting toward the operator to enable the operator to swing the jack, and a clamping mechanism on the jack arranged to hold a heel blank, and to be operated by the said lever to hold and release a blank.

13. In a machine of the class described, a heel shaping cutter, a jack arranged to be swung by the operator past the cutter, a cam track for giving the jack a vertical movement as it swings, a handle projecting toward the operator opposite the cam track, and a clamping mechanism on the jack for holding a heel blank and arranged to be operated by the said handle.

14. In a machine of the class described, a heel shaping cutter, a jack arranged to be swung by the operator past the cutter, a cam track for vertically tilting the jack as it swings, a handled member for swinging the jack, projecting toward the operator opposite the cam track, and a clamping mechanism on the jack for holding a heel blank and arranged to be operated by the said handled member.

In testimony whereof, said United Shoe Machinery Corporation has caused this specification to be signed and its corporate seal to be hereunto affixed by Louis A. Coolidge its treasurer, thereunto duly authorized.

[L. S.] UNITED SHOE MACHINERY CORPORATION,
*Assignee of John H. Vinton, Deceased.*
By LOUIS A. COOLIDGE,
*Treasurer.*

DISCLAIMER

Reis. No. 16,408.—*John H. Vinton*, deceased, Keene, N. H. HEEL-TURNING MACHINE. Patent dated August 24, 1926. Disclaimer filed November 25, 1929, by the assignee by mesne assignments, *United Shoe Machinery Corporation*.

Hereby enters this disclaimer to said claims 10 to 14, inclusive, of said reissued Letters Patent which are in the following words, to wit:

"10. In a machine of the class described, a cutter, a pivoted jack arranged to carry a heel blank into different positions relatively to the cutter, a clamping mechanism on the jack to hold the heel blank, and a manually operable member for operating the clamping mechanism arranged also to move the jack relatively to the cutter.

"11. In a machine of the class described, a heel shaping cutter, a jack pivotally mounted on the machine arranged to be swung past the cutter by the operator, a clamping mechanism for the heel blank on the jack, a manually operable member arranged to move generally perpendicularly to the direction of the said swinging movement to clamp the heel blank, and arranged also to effect the said swinging movement.

"12. In a machine of the class described, a rotating heel shaping cutter, a swinging arm, a jack pivoted on the arm and arranged to be swung by the operator about an axis parallel to that of the cutter, a lever projecting toward the operator to enable the operator to swing the jack, and a clamping mechanism on the jack arranged to hold a heel blank, and to be operated by the said lever to hold and release a blank.

"13. In a machine of the class described, a heel shaping cutter, a jack arranged to be swung by the operator past the cutter, a cam track for giving the jack a vertical movement as it swings, a handle projecting toward the operator opposite the cam track, and a clamping mechanism on the jack for holding a heel blank and arranged to be operated by the said handle.

"14. In a machine of the class described, a heel shaping cutter, a jack arranged to be swung by the operator past the cutter, a cam track for vertically tilting the jack as it swings, a handled member for swinging the jack, projecting toward the operator opposite the cam track, and a clamping mechanism on the jack for holding a heel blank and arranged to be operated by the said handled member."

[*Official Gazette December 17, 1929.*]